United States Patent [19]

Mickelson et al.

[11] Patent Number: 4,493,003

[45] Date of Patent: Jan. 8, 1985

[54] SURGE ARRESTER ASSEMBLY

[75] Inventors: Nils P. Mickelson, Raymond, Me.; Richard P. De LaChapelle, Rockport, Mass.

[73] Assignee: GTE Products Corporation, Stamford, Conn.

[21] Appl. No.: 461,764

[22] Filed: Jan. 28, 1983

[51] Int. Cl.[3] .................................... H02H 9/06

[52] U.S. Cl. .................................... 361/119; 361/124; 361/129

[58] Field of Search .................... 361/119, 124, 129; 313/325; 337/17, 18, 28, 31, 32, 33

[56] References Cited

U.S. PATENT DOCUMENTS

| | | | |
|---|---|---|---|
| 4,132,915 | 1/1979 | Wilms | 361/124 X |
| 4,321,649 | 3/1982 | Gilberts | 361/124 X |
| 4,340,923 | 7/1982 | Bazarian et al. | 361/129 X |

*Primary Examiner*—Harry E. Moose, Jr.

*Attorney, Agent, or Firm*—James Theodosopoulos

[57] ABSTRACT

A surge voltage arrester assembly for protection of communications lines from over voltage and excess current conditions includes a sealed cold cathode gas tube forming a primary arc gap and disposed within a cage member with an insulator member disposed between the gas tube and an electrical conductor forming a secondary arc gap sealed from contaminants, in parallel with the primary arc gap and affixed onto a cylindrical conductor by a retainer means.

9 Claims, 5 Drawing Figures

SURGE ARRESTER ASSEMBLY

TECHNICAL FIELD

This invention relates to surge voltage arrester assemblies and more particularly to surge voltage arrester assemblies having improved "back-up" surge arrester capabilities and improved assembly and retention means.

BACKGROUND ART

It is known that telephone lines and similar communication lines require protection from over voltage and excess-current conditions caused by power surges, lightning and similar undesired conditions. It is also known that hermetically sealed cold cathode gas tubes are a preferred form of primary arc gap arrester structures which, as is well known, includes a pair of electrodes spaced by an insulator and hermetically sealed to form the arc gap. Also, it is known that failure of cold cathode gas tubes is not unknown and that detection of such failure is most difficult since the electrical circuitry connected thereto operates normally and is only affected when excess or undesired conditions are encountered. Thus, provision of one or more "back-up" or redundant systems appears prudent.

One known attempt to provide added protection in a surge arrester assembly is set forth in U.S. Pat. No. 3,755,715, issued Aug. 28, 1973. Therein, a plurality of cup-like structures and a perforated insulator device are employed to provide a secondary arc gap having a break over voltage greater than the break over voltage of a cold cathode gas tube. Moreover, a solder pellet is also disposed within one of the cup-like structures to provide added protection against excessive voltage or current over an extended period of time. Unfortunately, the above-described structure leaves something to be desired due to the use of numerous non-standard parts which are not only difficult to obtain but also costly as well.

Attempts to overcome some of the difficulties of the above-described assembly are set forth in U.S. Pat. Nos. 4,208,694 and 4,241,374, issued June 17, 1980 and Dec. 23, 1980 respectively. Therein, a solder pellet is located intermediate first and second metal cups. The first metal cup engages one electrode of a gas discharge tube and has resilient fingers which contact an off-set portion of the second metal cup. The resilient fingers force the off-set portion of the second metal cup against an insulator ring and a secondary arc gap is provided intermediate the off-set portion of the second metal cup and an electrode of the arc discharge tube. Additionally, an O-ring and sealing compound are utilized in an attempt to protect the secondary arc gap from undesired ambient contaminants.

Although the above-described assemblies have provided enhanced capabilities, it has been found that there is still much to be desired insofar as improved over voltage protection and uniformity of result is concerned. Also, an assembly which utilizes sealing compounds to provide an assembled structure is most difficult to assemble without encountering undesired handling difficulties.

Still another known attempt to overcome the difficulties of the previously described structures is set forth in an application bearing U.S. Ser. No. 433,498, filed Oct. 8, 1982. Therein, a cage member with resilient fingers is slideably positioned within a housing member and includes a cold cathode gas tube providing a primary arc gap and an insulator having a plurality of holes and disposed intermediate a gas tube electrode and an electrical conductor to provide a secondary arc gap. The electrical conductor is held in position by the resilient fingers of the cage member.

Although a great improvement over previous known structures, problems were encountered in assembly fabrication and cost. For example, it was found that relying on the resilience of the fingers to retain structural integrity leaves something to be desired. Also, a multiplicity of components which require manufacturing operations adds to the cost of the structure. Further, it was found that direct contact of the solder pellet and a relatively large metal structure tends to undesirably develop a "heat sink" condition which is deleterious to the desired operation of the assembly.

OBJECTS AND SUMMARY OF THE INVENTION

An object of the present invention is to provide an improved surge voltage arrester assembly. Another object of the invention is to enhance the structure of a surge voltage arrester assembly. Still another object of the invention is to provide an improved "back-up" arc gap capability in a surge voltage arrester assembly. A further object of the invention is to enhance the response of a surge voltage arrester assembly to excess currents and voltages over an extended period of time.

These and other objects, advantages and capabilities are achieved in one aspect of the invention by a surge voltage arrester assembly wherein an electrically conductive cage member has resilient fingers slideably engaged within a tubular housing member, and a sealed cold cathode gas tube has a first electrode contacting the cage member and a second electrode space therefrom by an insulator forming a primary arc gap. The second electrode has an outwardly extending cylinder with an insulator, an electrical conductor and a retainer means telescoped thereover to provide a secondary arc gap sealed from external contaminants.

In another aspect of the invention, a tubular housing member has a spring therein contacted by an electrically conductive cage member having resilient fingers. A strapped insulator is located within the cage member with a solder pellet contacting the strapped insulator. A gas discharge tube has a first electrode contacting the solder pellet and a second electrode, spaced therefrom by an insulator forming a primary arc gap. A cyclinder extends outwardly from the second electrode and an insulator, a metal conductor electrode and a retainer are telescoped over the cylinder and provide a secondary arc gap sealed from external contaminants.

BEST MODE FOR CARRYING OUT THE INVENTION

Figure 1:
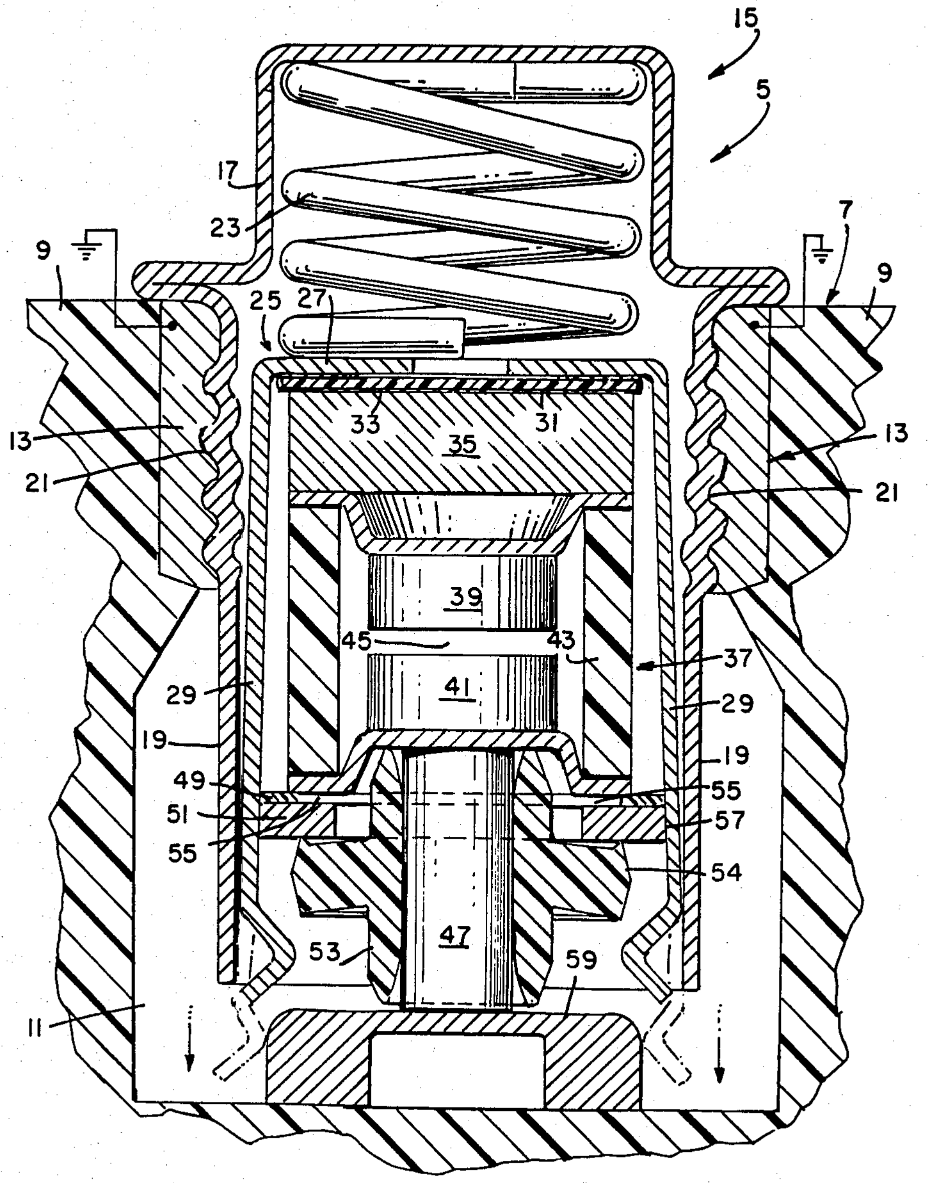
FIG. 1 is a sectional view of a surge voltage arrester assembly of the present invention.

For a better understanding of the present invention, together with other and further objects, advantages and capabilities thereof, reference is made to the following disclosure and appended claims in conjunction with the accompanying drawings.

Referring to the drawings, a surge voltage arrester assembly 5 is disposed within a station protector 7. The station protector 7 includes a block of dielectric material 9 having a wall portion 11 with an internally threaded metal member 13 positioned within the wall portion 11, affixed to the block of dielectric material 9 and connected to circuit ground.

The surge voltage arrester assembly 5 includes an electrically conductive metallic housing member 15 having a cup-shaped base portion 17 extending to a flanged tubular metallic portion 19 having an externally threaded portion 21. This externally threaded portion 21 is formed for engagement by the internally threaded metal member 13 of the station protector 7. Moreover, the cup-shaped base portion 17 preferably has a hexagon external configuration to facilitate insertion and removal.

A compression spring member 23 is located within and contacting the cup-shaped base portion 17. Also, a cage member 25 has a base portion 27 with affixed outwardly extending resilient finger members 29. The base portion 27 of the cage member 25 is in contact with the compression spring 23 and the resilient finger members 29 are slideably engaged by the tubular portion 19 of the housing member 15.

Disposed within the cage member 25 and contacting the base portion 27 thereof is an insulator disc 31 having an electrically conductive metal strap 33 folded thereabout. A fusible metal pellet 35 is in contact with the insulator disc 31 having the metal strap 33 thereon. A sealed cold cathode gas tube 37 has a first electrode 39 contacting the pellet 35 and separated from a second electrode 41 by a tubular ceramic insulator 43 forming a primary arc gap 45 between the first and second electrodes 39 and 41.

An electrically conductive metallic cylinder 47 is affixed to the second electrode 41 of the cold cathode gas tube 37 by welding or other well known means and an insulator wafer 49 is telescoped thereover and contacts the second electrode 41 of the gas tube 37. Also telescoped over the metallic cylinder 47 and contacting the insulator wafer 49 is an electrical conductor 51. Further, a retainer means 53 of resilient electrical insulating material is telescoped over and frictionally engages the cylinder 47. The retainer means 53 includes an outer ring portion 54 which acts as a Bellville spring in that added compressive force thereon causes the retainer means 53 to exert a resilient force on the electrical conductor 51 and insulator wafer 49. Thus, a secured secondary arc gap 55 is provided intermediate the second electrode 41 of the gas tube 37 and the electrical conductor 51. Also, this secondary arc gap 55 is of a length determined by the thickness of the insulator wafer 49 which also serves to isolate the secondary arc gap 55 from undesired external contaminants and ambient conditions. Moreover, the electrical conductor 51 has a diameter such that the outer periphery surface 57 thereof is in contact with the resilient finger members 29 of the cage member 25 and separates them from the second electrode 41 of the gas tube 37 by a distance greater than the secondary arc gap 55. Thus, the greater separation of the resilient finger members 29 from the second electrode 41 because of the size or dimension of the electrical conductor 51 as compared with the separation of the second electrode 41 and the electrical conductor 51 permits the desired secondary arc gap 55 and inhibits undesired arcing between the resilient finger members 29 and the second electrode 41.

Additionally, an electrical contact member 59 is located at the bottom of the wall portion 11 of the station protector 7 and provides a circuit connection to the metal cylinder 47 of the surge voltage arrester assembly 5. Thus, the metal cylinder 47 is connected to electrical circuitry by way of the contact member 59 while the resilient finger members 29 of the cage member 25 and the electrical conductor 51 in contact therewith are electrically connected to the tubular housing member 15 which is, in turn, electrically connected to circuit ground under normal operational conditions.

As to operation, it can readily be seen that the primary arc gap 45 of the gas discharge tube 37 and the secondary arc gap 55 intermediate the second electrode 41 of the discharge tube 37 and the electrical conductor 51 are in parallel connection intermediate the cylinder 47 connected to a line or circuit and the housing member 15 connected to circuit ground. Also, the secondary arc gap 55 is formed to have a breakdown voltage greater than the breakdown voltage of the primary arc gap 45 so long as the gas discharge tube 37 remains hermetically sealed. However, failure of the hermetic seal of the discharge tube 37 causes the primary arc gap 45 of the discharge tube 37 to have a breakdown voltage greater than the breakdown voltage of the secondary arc gap 55. Thus, arc gap protection is provided even though failure of the arc discharge tube 37 is encountered. Also, the secondary arc gap 55 is not only sealed from ambient conditions by the insulator wafer 49 but also of a substantially uniform dimension which is regulated by the thickness of the insulator wafer 49. Moreover, the insulator wafer 49 has a central aperture of a dimension greater than the central aperture of the electrical conductor 51 whereby dimensional control of the secondary arc gap 55 is also achieved.

Additionally, the above-mentioned overcurrent conditions for an extended period of time cause the above-described pellet 35 to melt. Thereupon, the compressed spring member 23 exerts a force on the base portion 27 of the cage member 25 in an amount sufficient to cause the resilient finger members 29 to contact the contact member 59. Thus, an electrical "grounding" condition is effected at the contact member 59 and on any active lines or apparatus connected thereto whenever undesired overcurrent conditions are encountered.

Further, it has been found that the insulator disc 31 having an electrically conductive metal strap 33 thereon has provided enhanced operation of the surge voltage arrester assembly 5. More specifically, it has been found that the base portion 27 of the cage member 25 tends to undesirably act as a "heat sink" when directly contacted by the pellet 35. Thus, the pellet 35 correspondingly is much slower to respond to increased overcurrent conditions. However, it has been found that the added insulator disc 31 with an electrically conductive metal strap 33 reduces the above-mentioned "heat sink" condition and enhances the response of the pellet 35 to overcurrent conditions.

Figure 2:
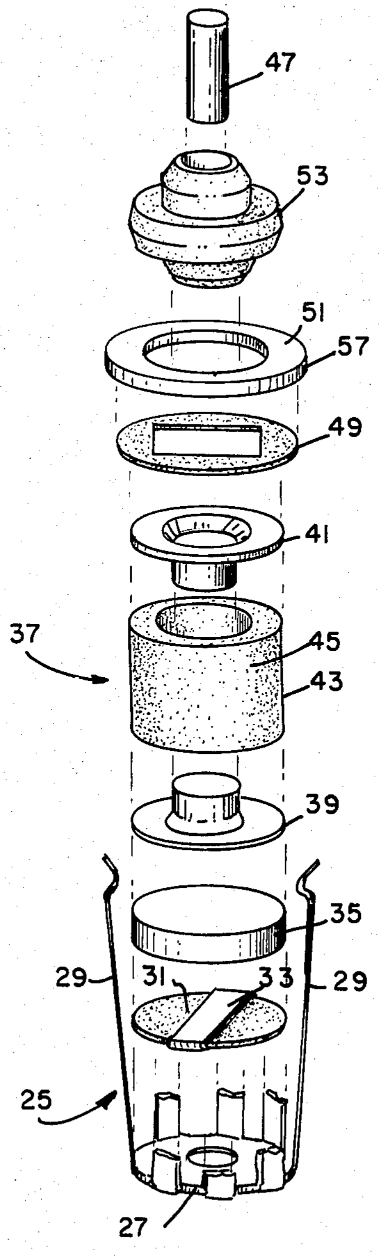
FIG. 2 is an exploded fragmentary view of a portion of the surge voltage arrester assembly of FIG. 1.
Figure 3:
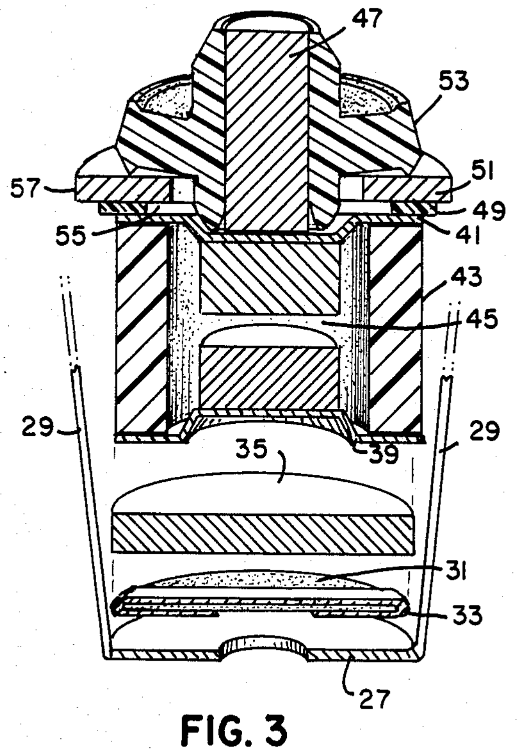
FIG. 3 is an exploded illustrative view of the "back-up" arc gap and retaining means of the assembly of FIG. 1.
Figure 4:
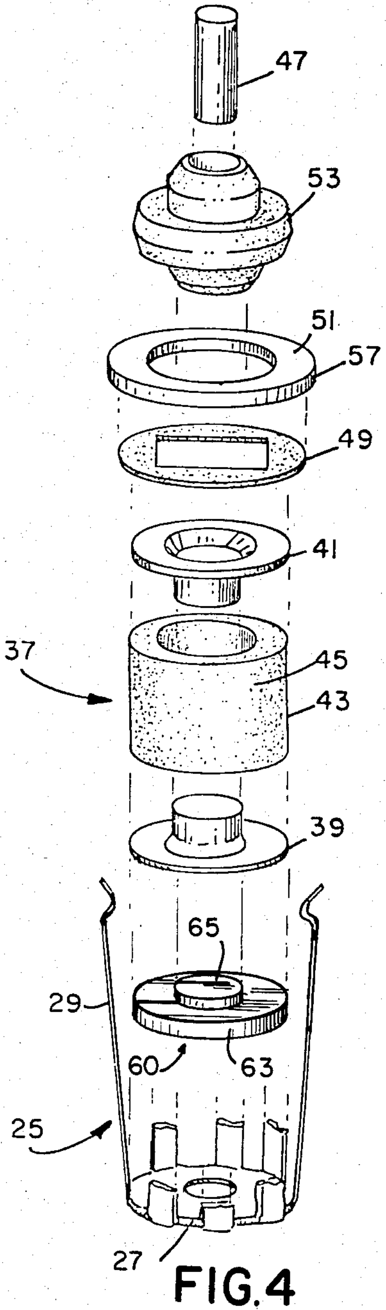
FIG. 4 is an exploded fragmentary view of an alternative surge voltage assembly.
Figure 5:
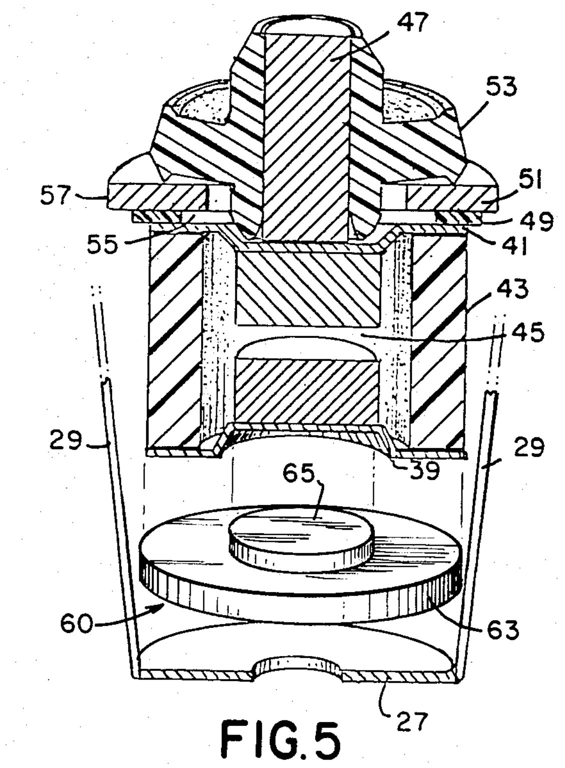
FIG. 5 is an exploded illustrative view of the alternative embodiment of FIG. 4.

Alternatively, FIGS. 4 and 5 provide a surge voltage arrester assembly, similar to the embodiment of FIGS. 2 and 3, and having a major portion of the parts therein similarly numbered. However, the insulator disc 31 and conductive metal strap 33 of FIGS. 2 and 3 are replaced by a fusible metal pellet 60 in FIGS. 4 and 5.

The fusible metal pellet 60 includes a relatively large disc-like portion 63 having an outwardly extending rather stubby circular-portion 65. This outwardly extending rather stubby circular portion 65 is formed for intimate contact with the first electrode 39 of the gas-filled tube 37. In this manner, a reduction in the melting time of the fusible metal pellet 60 is effected.

While there has been shown and described what is at present considered the preferred embodiments of the invention, it will be obvious to those skilled in the art that various changes and modifications may be made therein without departing from the invention as defined by the appended claims.

What is claimed is:

1. A surge voltage arrester assembly comprising:
- an electrically conductive tubular housing member;
- an electrically conductive cage member disposed within and having resilient finger members slideably engaging said housing member;
- a sealed cold cathode gas tube with first and second electrodes spaced by an insulator means to form a primary arc gap and said first electrode contacting said cage member;
- an electrically conductive cylinder extending outwardly of said second electrode;
- an insulator member and an electrical conductor telescoped over said cylinder to form a secondary arc gap intermediate said electrical conductor and second electrode; and
- retainer means telescoped over said cylinder intermediate thereto and said electrical conductor and contacting said second electrode and said electrical conductor to exert a retaining force against said electrical conductor and insulator member.

2. The surge voltage arrestor assembly of claim 1 wherein said electrical conductor separates said resilient finger members from said second electrode of said cold cathode gas tube at a distance greater than the distance from said electrical conductor to said second electrode of said cold cathode gas tube whereby said secondary arc gap is effected.

3. The surge voltage arrester assembly of claim 1 wherein said second electrode and electrical conductor and said insulator member and retainer means cooperate to seal said secondary air gap from exterior contaminants.

4. The surge voltage arrester assembly of claim 1 wherein said primary and secondary arc gaps are parallel connected electrically.

5. The surge voltage arrester assembly of claim 2 wherein said electrically conductive cage member includes a substantially circular support member affixed to said resilient finger members and contacting a spring member located within a cup-shaped base portion of said electrically conductive tubular housing member.

6. The surge voltage arrester assembly of claim 5 including a fusible pellet disposed within said cage, member intermediate said circular support member and said first electrode of said cold cathode gas tube.

7. The surge voltage arrester assembly of claim 5 including an insulator having an electrically conductive strap thereon and disposed within said cage member and contacting said support member and a fusible pellet contacting said insulator with said strap thereon and said first electrode of said gas tube.

8. The surge voltage arrester assembly of claim 5 wherein is included a fusible pellet having a substantially disc-like portion contacting said circular support member of said conductive cage member and an outwardly extending circular portion contacting an electrode of said sealed cold cathode gas tube whereby a reduction in the melting time of fusible pellet is effected.

9. In a surge voltage arrester assembly having an electrically conductive tubular housing member with a base portion and a threaded tubular portion, the improvement comprising:
- a cage member having a support member and affixed resilient finger members slideably engaging said tubular housing member;
- a spring member contacting said support member and said base portion of said housing member;
- a sealed cold cathode gas tube having a first electrode and a second electrode separated by an insulator means to provide a primary arc gap therebetween;
- fusible means electrically coupling an electrode of said sealed cold cathode gas tube to said support member of said cage member;
- an electrically conductive cylinder contacting and extending outwardly from said second electrode of said cold cathode gas tube;
- an insulator member telescoped over said electrically conductive cylinder;
- an electrical conductor telescoped over said electrically conductive cylinder and spaced from said second electrode by said insulator member to provide a secondary arc gap;
- a retainer means telescoped over and frictionally engaging said electrically conductive cylinder to exert a restraining force on said insulator member and said electrical conductor;
- wherein said fusible means includes a fusible metal member and an insulator having an electrically conductive strap on a portion thereof, the fusible metal member being disposed between the insulator and the first electrode of the gas tube, the fusible metal member also being in electrical contact with said electrically conductive strap and said first electrode, the insulator being disposed between the fusible metal member and the support member of the cage member, the electrically conductive strap providing electrical contact between the support member and the fusible metal member.

* * * * *